United States Patent
Tamura

(10) Patent No.: US 9,778,614 B2
(45) Date of Patent: Oct. 3, 2017

(54) DRIVE TRANSMITTING UNIT AND IMAGE FORMING APPARATUS INCLUDING THIS

(71) Applicant: KYOCERA Document Solutions Inc., Osaka (JP)

(72) Inventor: Yuki Tamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/212,585

(22) Filed: Jul. 18, 2016

(65) Prior Publication Data

US 2017/0031303 A1 Feb. 2, 2017

(30) Foreign Application Priority Data

Jul. 29, 2015 (JP) ................. 2015-149490

(51) Int. Cl.
G03G 21/16 (2006.01)
F16H 57/02 (2012.01)
F16H 1/20 (2006.01)

(52) U.S. Cl.
CPC .......... *G03G 21/1647* (2013.01); *F16H 1/20* (2013.01); *F16H 57/02* (2013.01); *G03G 21/1685* (2013.01)

(58) Field of Classification Search
CPC .......... G03G 21/1647; G03G 21/1642; G03G 2221/1651; G03G 2221/1657; F16H 57/02

See application file for complete search history.

(56) References Cited

U.S. PATENT DOCUMENTS 5,787,323 A * 7/1998 Nomura ............. G03G 21/1853
399/111
2001/0041080 A1* 11/2001 Higeta ............... G03G 15/0894
399/103

FOREIGN PATENT DOCUMENTS

JP 2001-092294 A 4/2001

* cited by examiner

*Primary Examiner* — Sandra Brase

(74) *Attorney, Agent, or Firm* — Studebaker & Brackett PC

(57) ABSTRACT

A drive transmitting unit includes a plurality of gears and a gear case. The plurality of gears composes a part of a gear train transmitting a rotational force from a main driving part to a rotational element within an apparatus body. The gear case is provided attachably to/detachably from an attachment part defined from a lower surface or aback surface of the apparatus body to inside of the apparatus body while rotatably supporting the plurality of gears. The gear case includes a hook part, a fitting part and a fixing part. The hook part is hooked with a hooked part provided within the attachment part. The fitting part is fitted with a fitted part provided within the attachment part. The fixing part is fixed to the apparatus body through a fastening member.

6 Claims, 14 Drawing Sheets

DRIVE TRANSMITTING UNIT AND IMAGE FORMING APPARATUS INCLUDING THIS

INCORPORATION BY REFERENCE

This application is based on and claims the benefit of priority from Japanese Patent application No. 2015-149490 filed on Jul. 29, 2015, the entire contents of which are incorporated herein by reference.

BACKGROUND

The present disclosure relates to a drive transmitting unit configured to removably attached to an apparatus body and an image forming apparatus including this.

An electro-photographic image forming apparatus includes a mechanism for transmitting a rotational force to a member rotating centering on a shaft.

For instance, the image forming apparatus includes a plurality of gears (gear train) for transmitting a rotational force of a driving motor to a fixing roller of a fixing unit. A gear (pinion gear) fitted to a driving shaft of the driving motor rotates a driving-side coupling gear through a plurality of gears. The driving-side coupling gear rotates a fixing-side coupling gear fixed to an end of the fixing roller.

The fixing roller requires a large torque for its rotation because the fixing roller is in pressure contact with a press roller. Accordingly, a large load is applied to both of the driving-side and fixing-side coupling gears. Due to that, it is desirable to periodically replace the respective coupling gears. However, it takes time to replace the respective coupling gears in the image forming apparatus described above.

SUMMARY OF THE INVENTION

In accordance with an embodiment of the present disclosure, a drive transmitting unit includes a plurality of gears and a gear case. The plurality of gears composes a part of a gear train transmitting a rotational force from a main driving part to a rotational element within an apparatus body. The gear case is provided attachably to/detachably from an attachment part defined from a lower surface or a back surface of the apparatus body to inside of the apparatus body while rotatably supporting the plurality of gears. The gear case includes a hook part, a fitting part and a fixing part. The hook part is hooked with a hooked part provided within the attachment part. The fitting part is fitted with a fitted part provided within the attachment part. The fixing part is fixed to the apparatus body through a fastening member.

In accordance with an embodiment of the present disclosure, an image forming apparatus includes an apparatus body and a drive transmitting unit configured to removably attached to the apparatus body. The drive transmitting unit includes a plurality of gears and a gear case. The plurality of gears composes a part of a gear train transmitting a rotational force from a main driving part to a rotational element within the apparatus body. The gear case is provided attachably to/detachably from an attachment part defined from a lower surface or a back surface of the apparatus body to inside of the apparatus body while rotatably supporting the plurality of gears. The gear case includes a hook part, a fitting part and a fixing part. The hook part is hooked with a hooked part provided within the attachment part. The fitting part is fitted with a fitted part provided within the attachment part. The fixing part is fixed to the apparatus body through a fastening member.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

A suitable embodiment of the present disclosure will be described below with reference to the attached drawings. It is noted that the following description will be made by based on directions indicated in each drawing.

Figure 1:
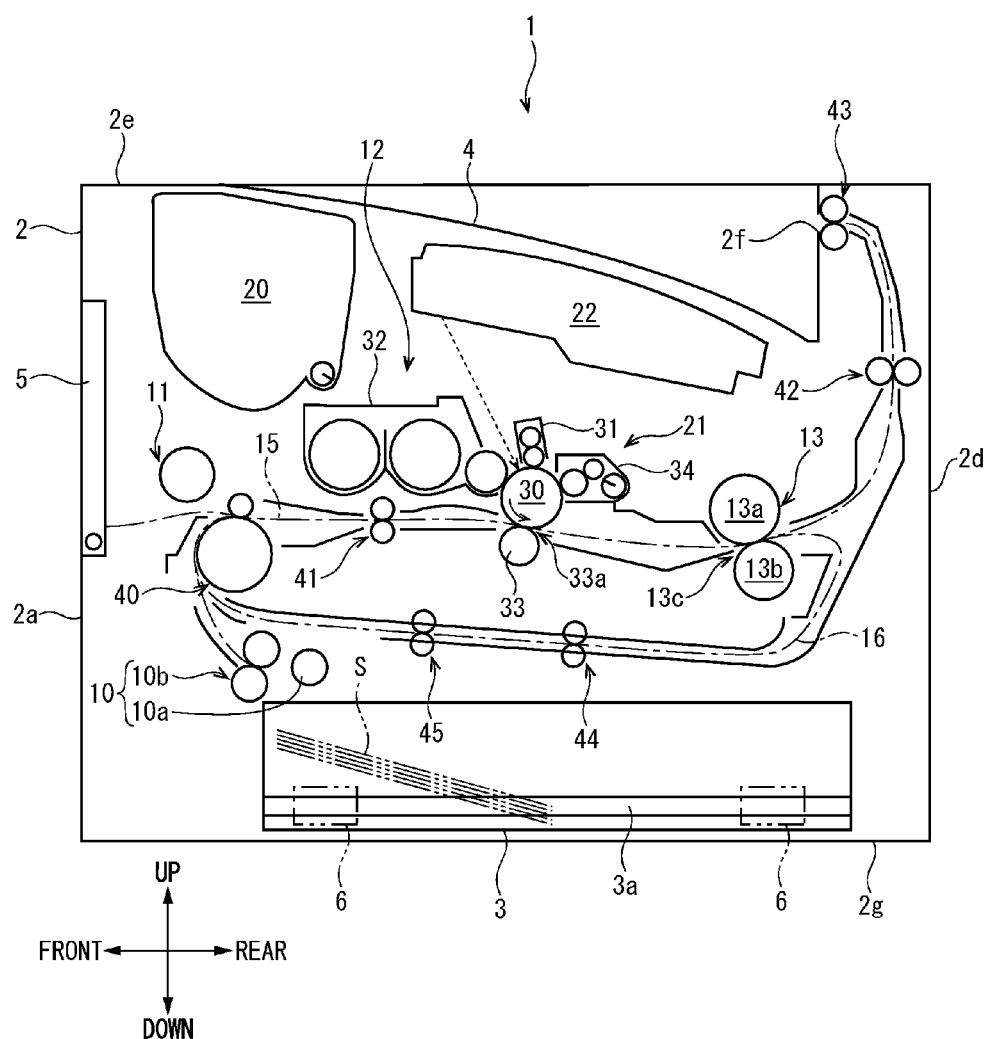
FIG. 1 is a sectional view, seen from the right side, schematically illustrating a printer according to one embodiment of the present disclosure.
Figure 2:
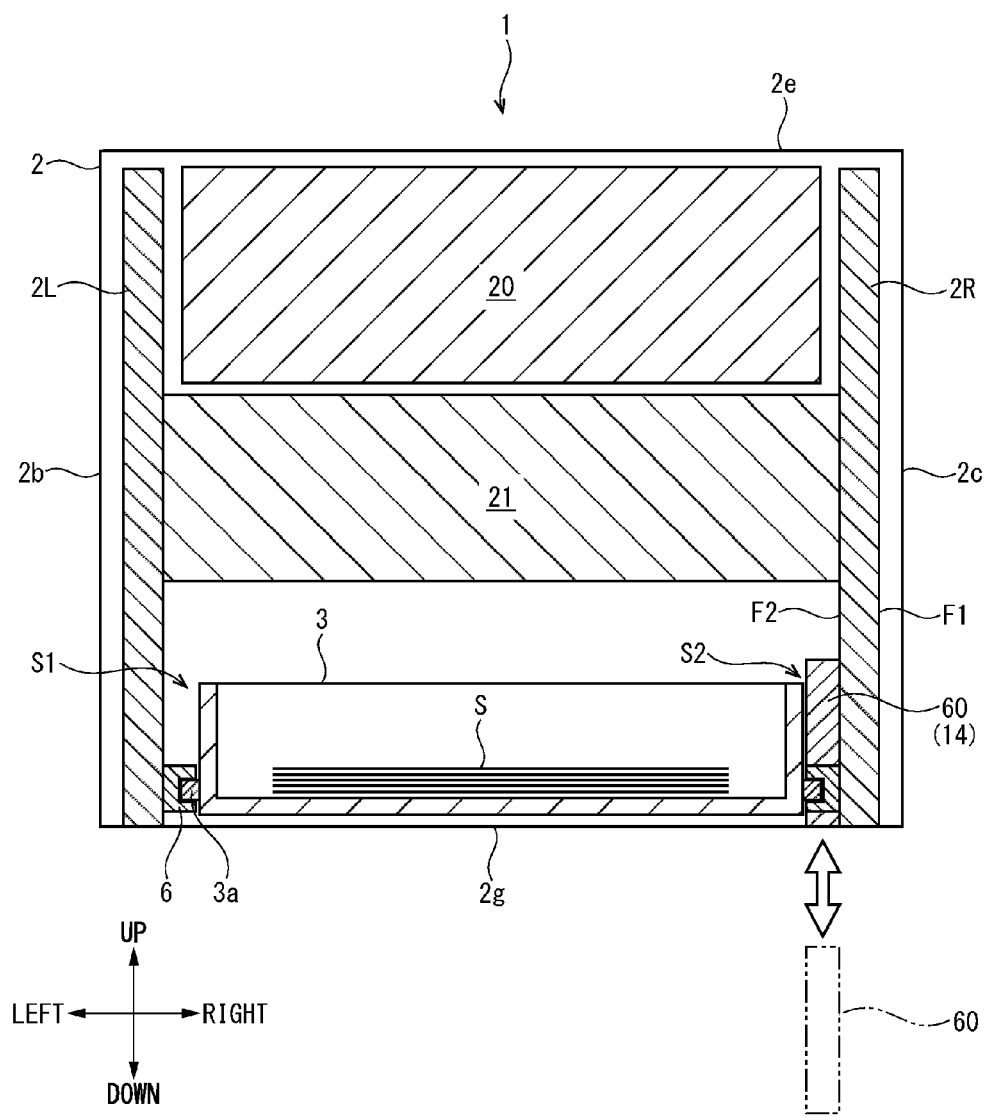
FIG. 2 is a sectional view, seen from the front side, schematically illustrating the printer according to one embodiment of the present disclosure.
Figure 3:
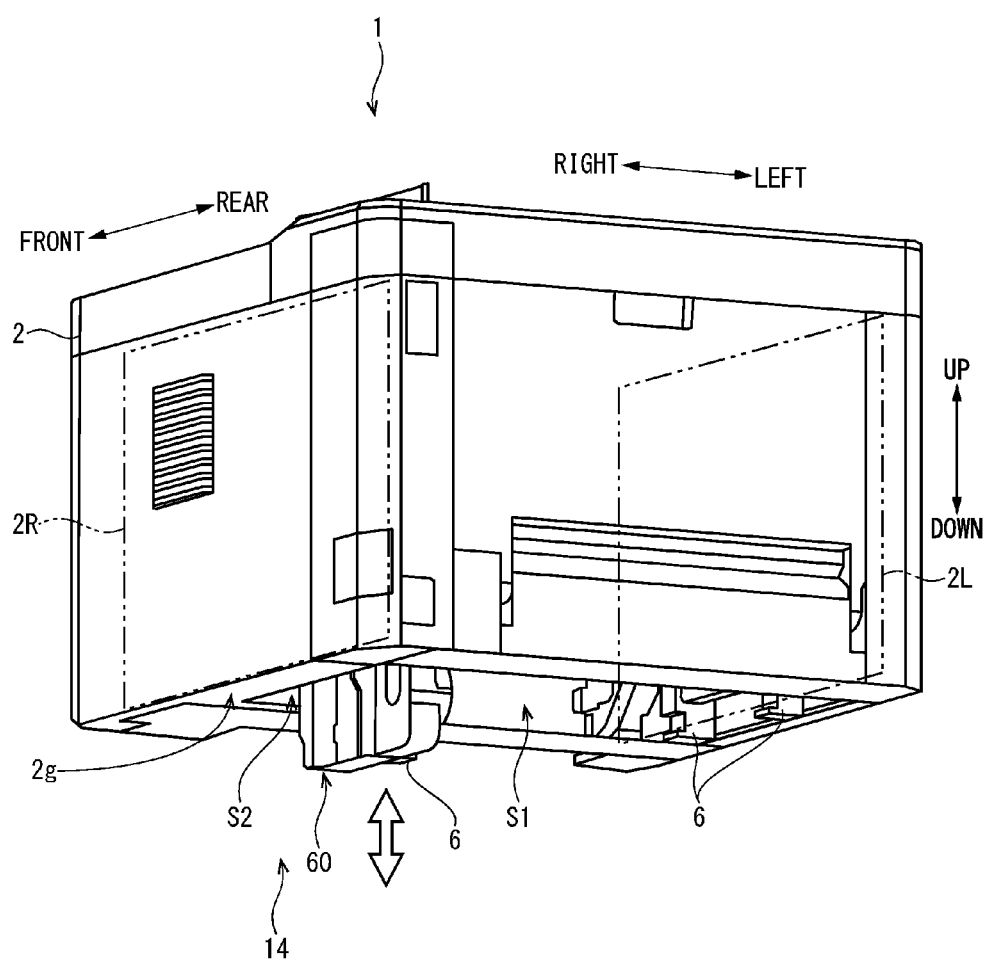
FIG. 3 is a perspective view illustrating the printer according to one embodiment of the present disclosure.

Reference to FIGS. 1 through 3, a printer 1, i.e., an image forming apparatus, will be described. FIG. 1 is a sectional view, seen from the right side, illustrating the printer 1. FIG. 2 is a sectional view, seen from the front side, illustrating the printer 1. FIG. 3 is a perspective view illustrating the printer 1.

As shown in FIG. 1, the printer 1 includes a box-like apparatus body 2 storing various devices for forming an image on a sheet. Front, rear, left, and right side surfaces of the apparatus body 2 are covered respectively by a front side plate 2a, a left side plate 2b, a right side plate 2c and a rear side plate 2d, which function also exterior panels. Still further, an upper surface of the apparatus body 2 is covered by a top plate 2e. A sheet feed cassette 3 is provided at a lower part of the apparatus body 2. A manual feed tray 5 is openably/closeably provided at a front side plate 2a of the apparatus body 2.

As shown in FIGS. 2 and 3, the apparatus body 2 is formed approximately into a rectangular parallelepiped case containing a left frame 2L and a right frame 2R facing with each other in a left-right direction. The pair of left and right frames 2L and 2R is made of sheet metal and is formed approximately into a rectangular shape in a side view (see FIG. 4). A power supply board, a control board, a high pressure board and others not shown are disposed within spaces between the frames 2L and 2R and the side plates 2b and 2c. The sheet feed cassette 3 is disposed in an attachment part S1 defined between the pair of left and right frames 2L and 2R. The attachment part S1 is a space whose front and under surfaces are opened. Sliders 3a are formed at both left and right side surfaces of the sheet feed cassette 3 (see FIG. 1). The pair of left and right sliders 3a slidably engages with four (front, rear, left and right) slide guides 6 within the attachment part S1. Thereby, the sheet feed cassette 3 can be inserted into/removed out of the apparatus body 2 (within the attachment part S1) in a front-rear direction. The sheet S (bundle of the sheets S) is stored within the sheet feed cassette 3. It is noted that the sheet S is not limited to a sheet of paper and may be a resin film or the like.

As shown in FIG. 1, the printer 1 includes a sheet feeding part 10, a manual sheet feed roller 11, an image forming part 12, a fixing unit 13 and a driving mechanism 14 (refer to FIG. 4) within the apparatus body 2. The sheet feeding part 10 is provided upstream of a conveying path 15 extended from the sheet feed cassette 3 to the discharge tray 4. The manual sheet feed roller 11 is provided in a vicinity of the manual feed tray 5. The image forming part 12 is provided at an intermediate part of the conveyance path 15, and the fixing unit 13 is provided downstream of the conveyance path 15. The driving mechanism 14 is provided at a lower right part of the apparatus body 2.

The sheet feeding part 10 includes a pickup roller 10a and a sheet feed roller pair 10b. The pickup roller 10a delivers the sheet S within the sheet feed cassette 3 one by one toward the sheet feed roller pair 10b. The sheet feed roller pair 10b nips the sheet S and rotates to send the sheet S to the conveyance path 15. The manual sheet feed roller 11 delivers the sheet S stacked on the manual feed tray 5 one by one to the conveyance path 15.

The image forming part 12 includes a tonner container 20, a drum unit 21 and an optical scanning device 22. The tonner container 20 and the optical scanning device 22 are disposed under the discharge tray 4. The drum unit 21 is disposed under the optical scanning device 22.

The tonner container 20 house toner (developing agent). The drum unit 21 includes a photosensitive drum 30, a charging device 31, a developing device 32, a transfer roller 33 and a cleaning device 34. The photosensitive drum 30 is rotationally driven by the driving mechanism 14. The transfer roller 33 is in pressure contact with the photosensitive drum 30 and forms a transfer nip part 33a.

The fixing unit 13 includes a heat roller 13a and a press roller 13b. The heat roller 13a is heated by a heater not shown and is rotationally driven by the driving mechanism 14. The press roller 13b is in pressure contact with the heat roller 13a so as to form a fixing nip part 13c and rotates following the heat roller 13a.

Disposed along the conveyance path 15 are an intermediate roller pair 40, a registration roller pair 41, a conveyance roller pair 42 and a discharge roller pair 43. The intermediate roller pair 40 is provided downstream of the sheet feed part 10 (the manual feed roller 11). The registration roller pair 41 is provided between the intermediate roller pair 40 and the photosensitive drum 30. The conveyance roller pair 42 is provided downstream of the fixing unit 13. The discharge roller pair 43 is provided inside of the apparatus body 2 at a discharge port 2f. The respective roller pairs 40 through 43 nip the sheet S and rotate to convey the sheet S downstream of the conveyance path 15. The registration roller pair 41 temporarily blocks the sheet S being conveyed through the conveyance path 15 to adjust a front end position of the sheet S.

A reverse conveyance path 16 through which the sheet S is conveyed in printing on both surfaces branches from the conveyance path 15 downstream of the fixing unit 13 and merges with the conveyance path 15 upstream of the intermediate roller pair 40. A first reversing roller pairs 44 and a second reversing roller pairs 45 are disposed along the reverse conveyance path 16. The first and second reversing roller pairs 44 and 45 nip the sheet S and rotate respectively to deliver the sheet S downstream of the reverse conveyance path 16.

While a detailed description will be made later, the driving mechanism 14 is provided to rotationally drive the heat roller 13a, the photosensitive drum 30, and one driving rollers of the respective roller pairs 10b, 40 through 45 (referred to also as 'rotational elements' hereinafter).

The charging device 31 electrifies a surface of the photosensitive drum 30. The optical scanning unit 22 makes exposure toward the photosensitive drum 30. The developing device 32 develops an electrostatic latent image formed on the surface of the photosensitive drum 30 as a toner image. The toner image is transferred onto the sheet S passing through the transfer nip part 33a. The fixing unit 13 applies pressure and heat to the sheet S passing through the fixing nip part 13c to fix the toner image onto the sheet S. After being fixed, the sheet S is discharged on the sheet discharge tray 4. After the transfer, a cleaning device 34 removes toner left on the surface of the photosensitive drum 30.

Figure 4:
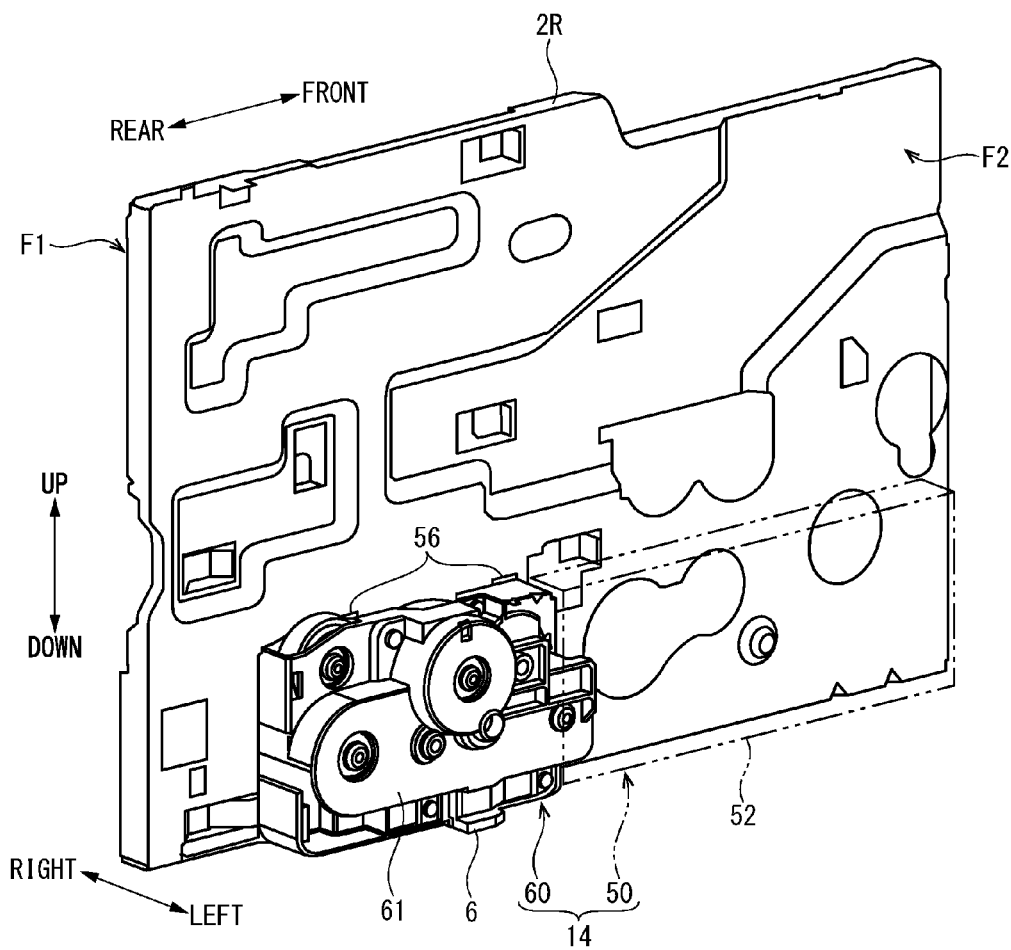
FIG. 4 is a perspective view illustrating a driving mechanism and a right frame of the printer according to one embodiment of the present disclosure.
Figure 5:
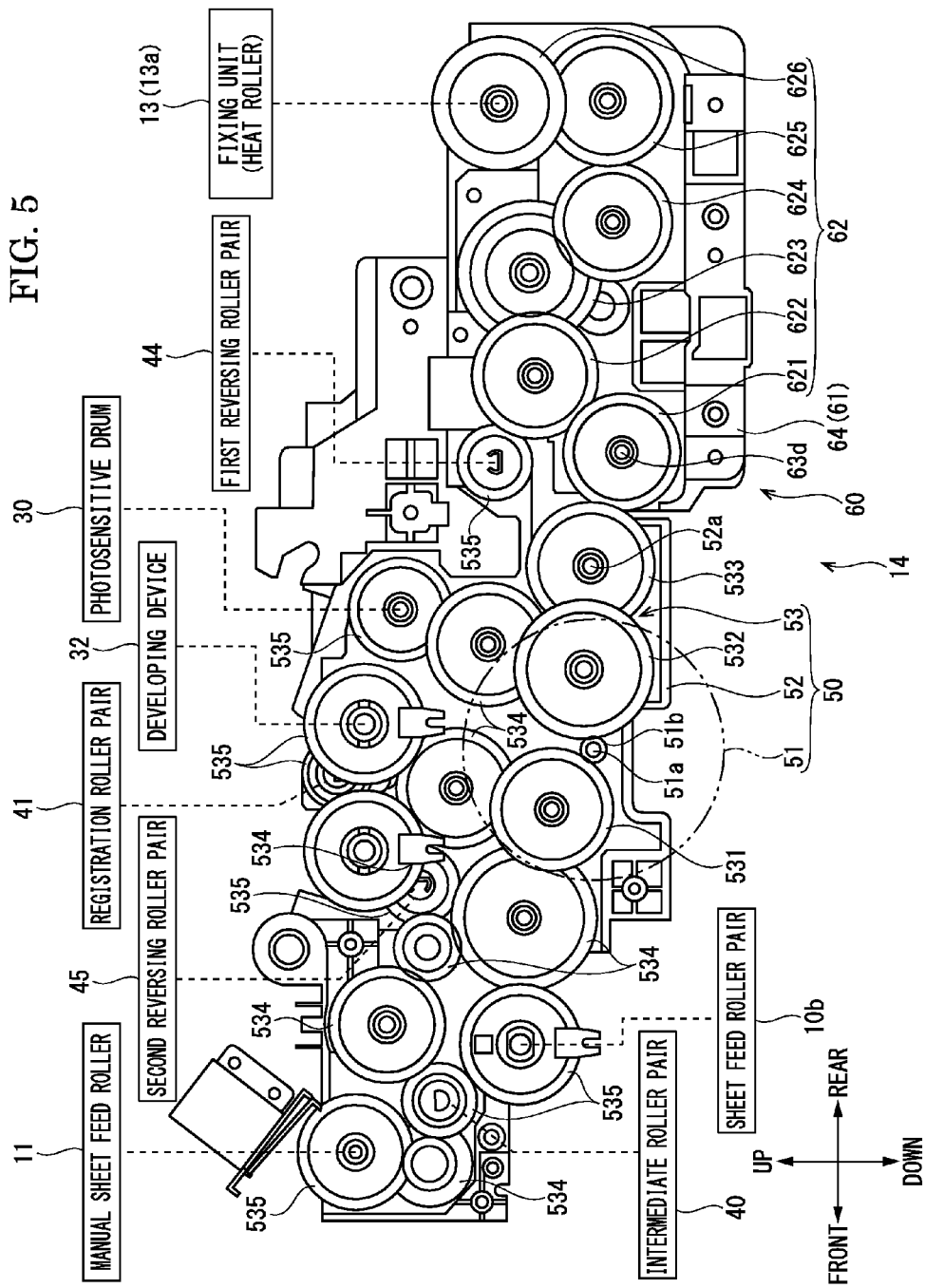
FIG. 5 is a side view illustrating the driving mechanism of the printer according to one embodiment of the present disclosure.
Figure 6:
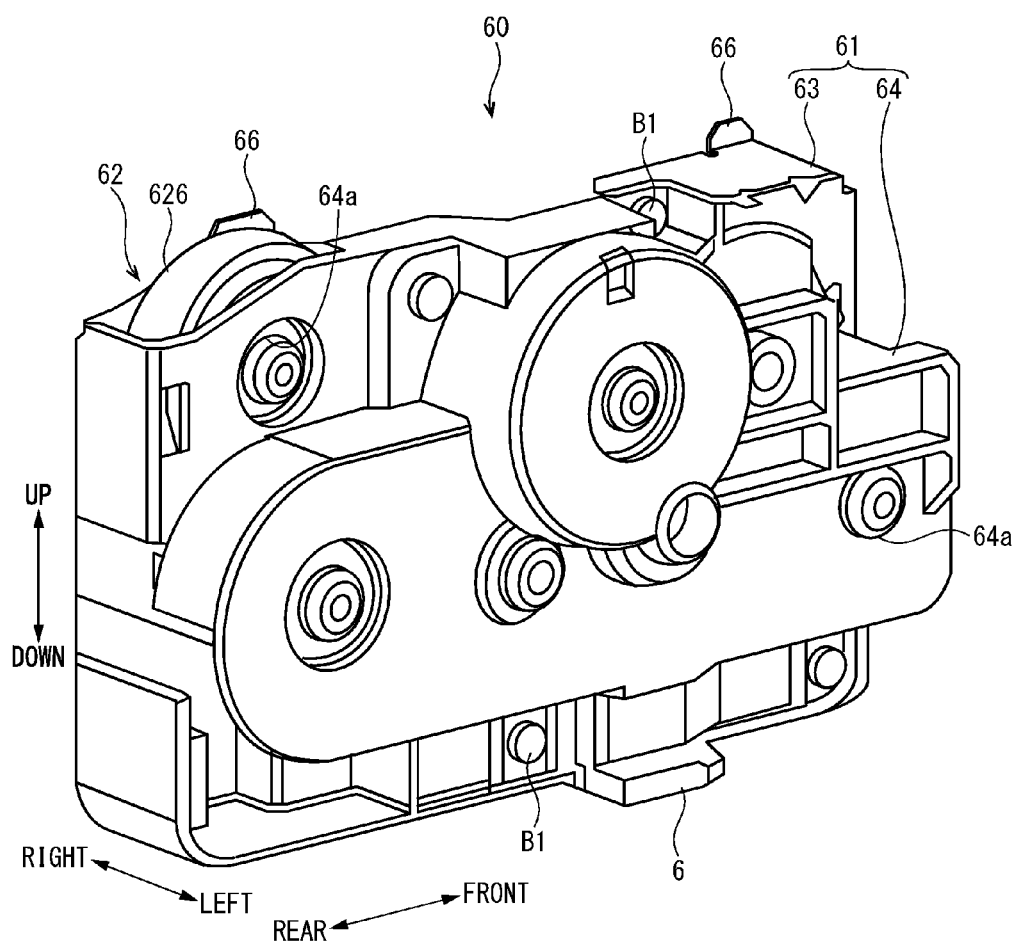
FIG. 6 is a perspective view, seen from the left side, illustrating a second drive transmitting unit according to one embodiment of the present disclosure.
Figure 7:
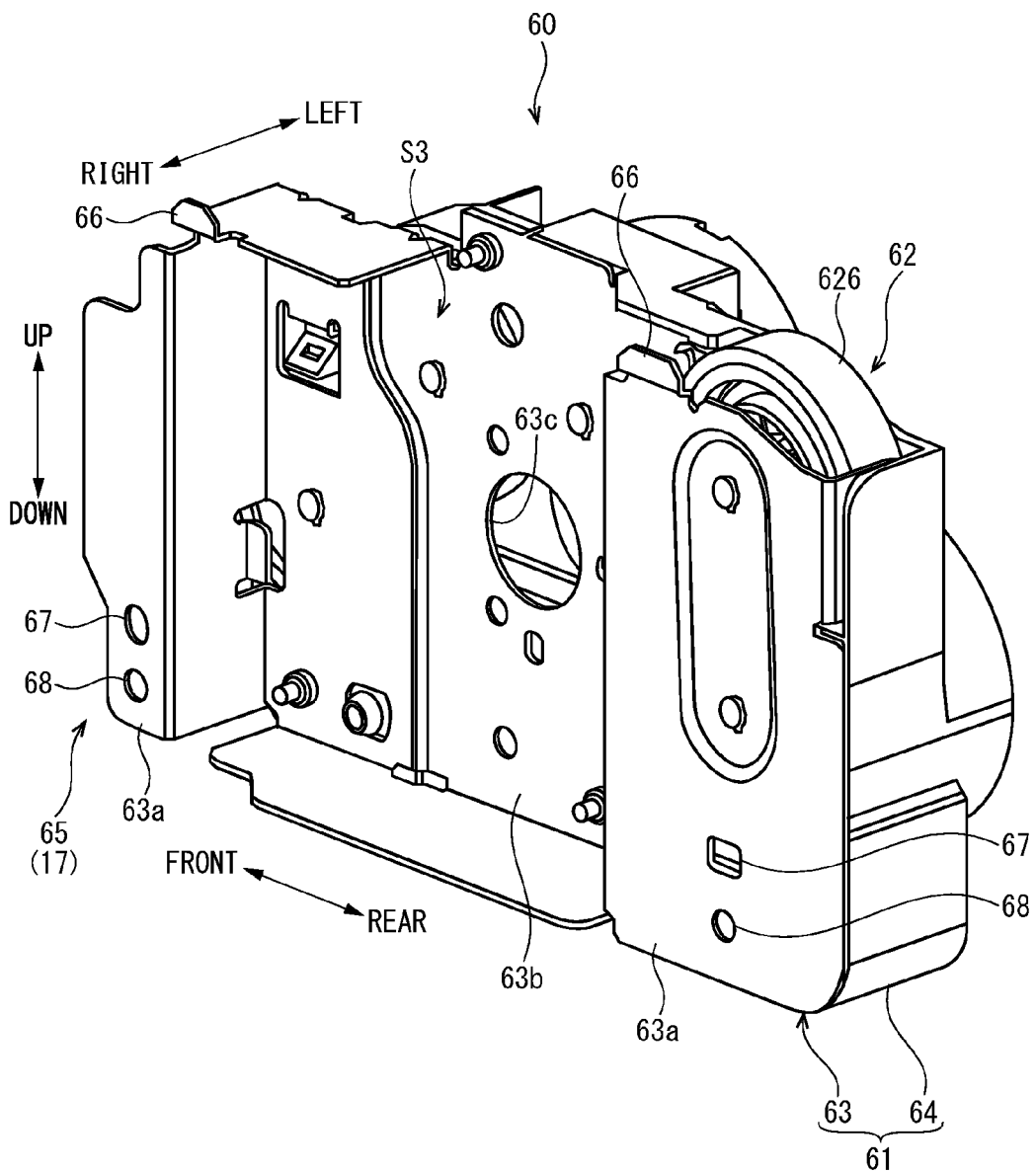
FIG. 7 is a perspective view, seen from the right side, illustrating the second drive transmitting unit according to one embodiment of the present disclosure.
Figure 8:
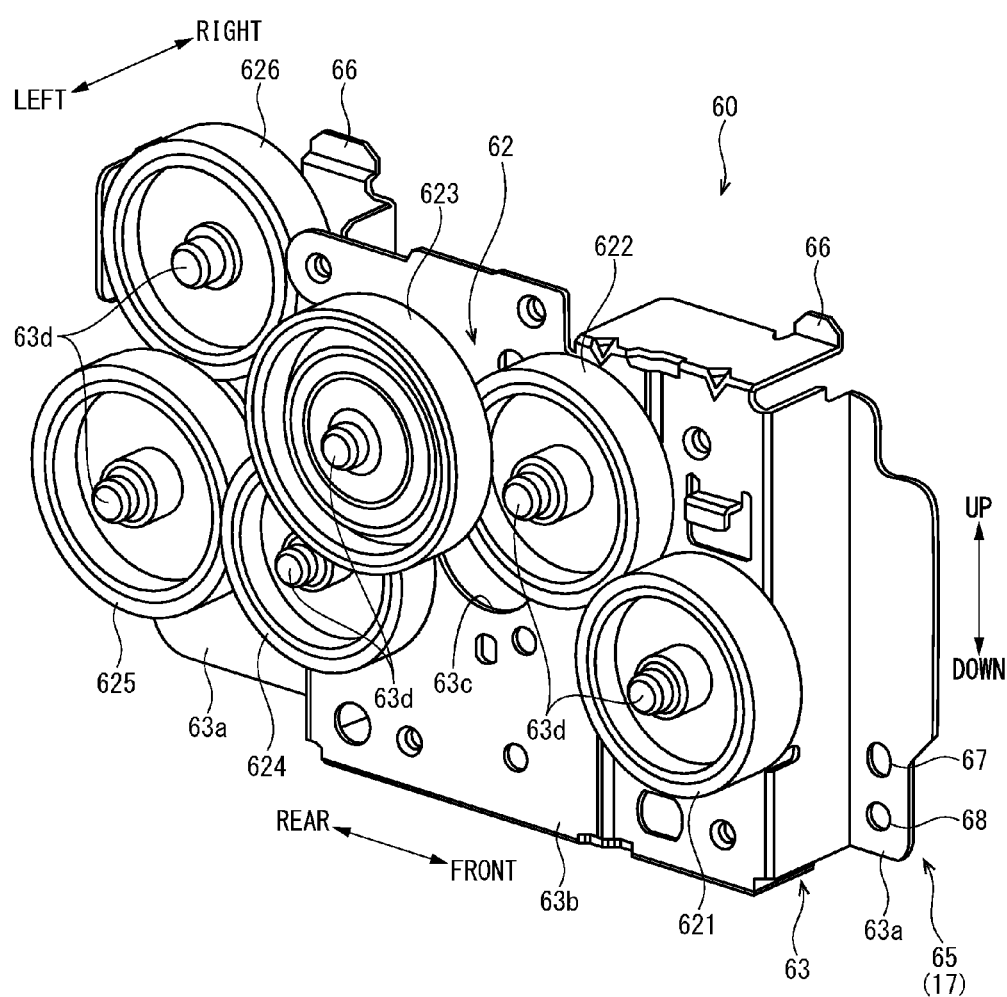
FIG. 8 is a perspective view illustrating a second gear train of the second drive transmitting unit according to one embodiment of the present disclosure.
Figure 9:
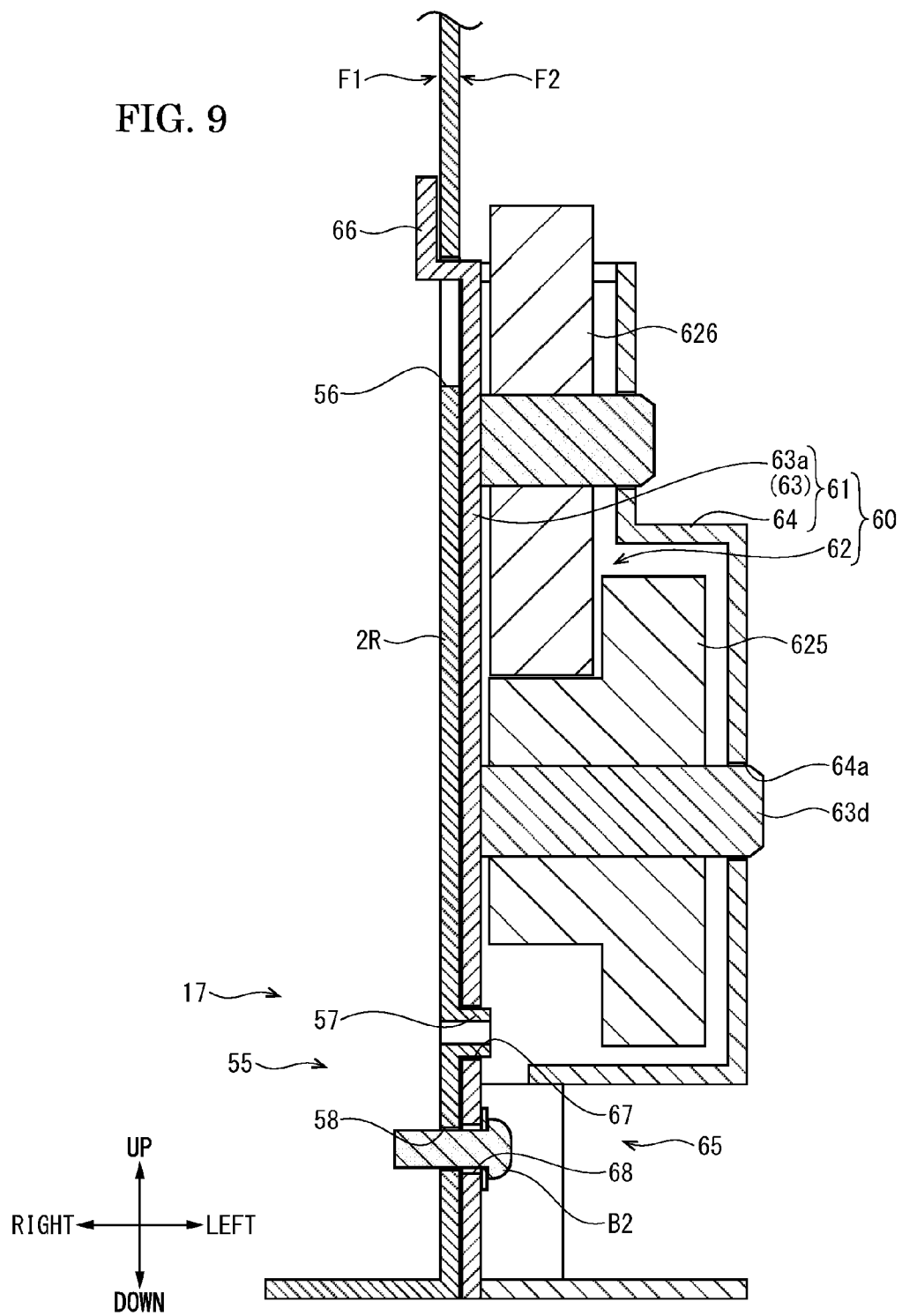
FIG. 9 is a sectional view, seen from the rear side, illustrating the second drive transmitting unit according to one embodiment of the present disclosure.

Next, reference to FIGS. 4 through 9, the driving mechanism 14 will be described. FIG. 4 is a perspective view illustrating the driving mechanism 14 and the right frame 2R. FIG. 5 is a side view illustrating the driving mechanism 14. FIG. 6 is a perspective view, seen from the left side, illustrating a second drive transmitting unit 60. FIG. 7 is a perspective view, seen from the right side, illustrating the second drive transmitting unit 60. FIG. 8 is a perspective view illustrating a second gear train 62 of the second drive transmitting unit 60. FIG. 9 is a sectional view, seen from the rear side, illustrating the second drive transmitting unit 60.

As shown FIG. 4, the driving mechanism 14 includes a first drive transmitting unit 50 and the second drive transmitting unit 60. The first drive transmitting unit 50 is supported at a lower part of the right frame 2R of the apparatus body 2. The second drive transmitting unit 60 is removably attached to the attachment part S2 defined from a lower surface 2g toward inside of the apparatus body 2 (see FIG. 3).

As shown FIG. 5, the first drive transmitting unit 50 includes a main motor 51, a gear frame 52 and a first gear train 53. The first drive transmitting unit 50 is disposed at a front lower part of the right frame 2R in a side view (see FIG. 4).

The main motor 51 is composed of a so-called stepping motor or the like whose position (rotational angle) can be controlled. The main motor 51 is fixed to an outer surface F1 (right surface) of the right frame 2R by a plurality of screws not shown. An output shaft 51a of the main motor 51 penetrates through the right frame 2R from outside to inside. A pinion gear 51b is fixed at a tip of the output shaft 51a.

The gear frame 52 is formed approximately into a rectangular shape which is long in the front-rear direction in a side view. The gear frame 52 is disposed along the inner surface F2 (left surface) of the right frame 2R (see FIG. 4). The gear frame 52 is fixed to the right frame 2R with a space in which the first gear train 53 is to be disposed between the gear frame 52 and the inner surface F2 of the right frame 2R. A plurality of support shafts 52a is provided in the gear frame 52. The plurality of support shafts 52a is formed respectively into a columnar shape and projects in a right direction from a right side surface of the gear frame 52.

The first gear train 53 is composed of a first input gear 531, a second input gear 532, a connecting gear 533, a plurality of intermediate gears 534 and a plurality of output gears 535 in combination. The respective gears 531 through 535 are supported by the support shafts 52a so as to rotate centering on the support shafts 52a. The first gear train 53 is combined so as to rotate the respective rotational elements in a predetermined direction with predetermined speed.

The first input gear 531 meshes with the pinion gear 51b of the main motor 51 from the front side. The second input gear 532 meshes with the pinion gear 51b from the rear side. The connecting gear 533 meshes with the second input gear 532 from the rear side. The plurality of output gears 535 is connected to the first input gear 531 or the second input gear 532 respectively through the plurality of intermediate gears 534. The rotational elements such as the photosensitive drum 30, the developing device 32, and the driving roller or the like of the respective roller pairs 10b, 11, 40, 41 and 45 are connected to the plurality of output gears 535.

The main motor 51 rotates the first and second input gears 531 and 532 through the pinion gear 51b. The first and second input gears 531 and 532 rotate the plurality of output gears 535 through the plurality of intermediate gears 534. Thereby, the rotational force of the main motor 51 is transmitted to the photosensitive drum 30, the developing device 32, and the driving rollers of the respective roller pairs 10b, 11, 40, 41, and 45.

As shown FIG. 5, the second drive transmitting unit 60 includes a gear case 61 and the second gear train 62. The second drive transmitting unit 60 is disposed at a rear lower part of the right frame 2R in a side view (see FIG. 4).

As shown FIGS. 6 and 7, the gear case 61 includes a case body 63 and a cover 64. The gear case 61 is formed approximately into a rectangular box and is disposed along the inner surface F2 of the right frame 2R (see FIG. 4).

As shown in FIGS. 7 and 8, the case body 63 is formed by bending a sheet metal. The case body 63 includes a pair of fixing plates 63a bent into a crank shape from both front and rear ends of the support plate 63b. The pair of front and rear fixing plates 63a (fixing parts) is formed such that they come into surface contact with the inner surface F2 of the right frame 2R (see FIG. 9). The rear fixing plate 63a is formed to be wider in width than the front fixing plate 63a. The support plate 63b is formed inside (left side) with respect to the respective fixing plates 63a in a plan view. Accordingly, a disposition space S3 enabling to dispose a sub-motor 70 described later is formed between the right frame 2R and the support plate 63b. A circular insertion hole 63c is perforated approximately at center of the support plate 63b.

As shown in FIG. 8, the support plate 63b is provided with three support shafts 63d, and the rear fixing plate 63a is provided with two support shafts 63d. Each support shaft 63d is formed into a columnar shape and projects in a left direction from a left side surface of the respective plates 63a and 63b.

As shown in FIG. 6, the cover 64 is formed of synthetic resin approximately into a box shape. The cover 64 covers the case body 63 from the left side and is fixed to the case body 63 by four screws B1. The cover 64 is fixed to the case body 63 with a space enabling to dispose the second gear train 62 between the cover 64 and the case body 63. The cover 64 is provided with a plurality of shaft holes 64a. The respective shaft holes 64a support tips of the support shafts 63d in a state in which the cover 64 is fixed to the case body 63.

As shown in FIGS. 5 and 6, the second gear train 62 is composed of one removable gear 621 and five transmission gears 622, 623, 624, 625, 626 in combination. The six gears 621 through 626 are supported by the support shafts 63d so as to rotate centering on the support shafts 63d. The six gears 621 through 626 are combined so as to rotate the respective rotational elements (the heat roller 13a, the driving roller of the first reversing roller pairs 44 or the like) in a predetermined direction with predetermined speed.

The removable gear 621 is attached to the support shaft 63d at the frontmost part of the case body 63. The removable gear 621 is removably attached to the gear case 61. The removable gear 621 meshes with the connecting gear 533 from the rear side. The transmission gear 622 meshes with the output gear 535 and the removable gear 621 connected with the first reverse roller pair 44 (see FIG. 5). The gear train 626 is connected to the heat roller 13a. The transmission gears 622 through 626 transmit the rotation of the removable gear 621 to the heat roller 13a.

The removable gear 621 receives the rotational force of the main motor 51 indirectly (through the second input gear 532 and the connecting gear 533) and rotates the transmission gears 622 through 626. This arrangement makes it possible to transmit the rotational force of the main motor 51 to the driving roller of the first reverse roller pair 44 and the heat roller 13a. As described above, by being connected with the first gear train 53, the second gear train composes a series of gear trains transmitting the rotational force from the main motor 51 to the heat roller 13a. The six gears 621 through 626 compose a part of the series of gear train.

Here, as shown in FIGS. 2 and 3, the gear case 61 is removably attached to the attachment part S2 while rotatably supporting the six gears 621 through 626. The attachment part S2 is composed as a part of the attachment part S1. The attachment part S2 is a space whose under surface is opened at the rear right part of the attachment part S1. The second drive transmitting unit 60 (the gear case 61) attached to the attachment part S2 also has the function of guiding the slides of the sheet feed cassette 3. That is, as shown in FIG. 6, the gear case 61 (the cover 64) has slide guides 6 slidably engaging with the slider 3a of the sheet feed cassette 3. That is, the rear right slide guides 6 among the four slide guides 6 are formed at a lower part of the cover (see FIG. 3). The respective slide guides 6 make it possible to smoothly slide the sheet feed cassette 3.

A positioning structure 17 for fixing the second drive transmitting unit 60 within the attachment part S2 is formed along the right frame 2R and the gear case 61.

As shown FIG. 9, the positioning structure 17 includes a body-side fixing part 55 and an apparatus-side fixing part 65. The body-side fixing part 55 is formed on the right frame 2R. The apparatus-side fixing part 65 is formed on the gear case 61 (the case body 63).

The body-side fixing part 55 includes a pair of front and rear hooking holes 56, a pair of front and rear fitting projections 57 and a pair of front and rear female screw parts 58. The pair of front and rear hooking holes (hooked parts) 56 is provided at an upper part within the attachment part S2. Each hooking hole 56 is approximately a rectangular opening in a side view and is perforated through the right frame 2R (see FIG. 4). The rear hooking hole 56 is defined to be longer than the front hooking hole 56 in the front-rear direction. The pair of front and rear fitting projections (fitted parts) 57 is provided at a lower part (lower than the hooking hole 56) within the attachment part S2. Each fitting projection 57 is projectively provided on the inner surface F2 of the right frame 2R. Each fitting projection 57 is formed by burring the right frame 2R. The pair of front and rear female screw parts 58 is provided at a lower end part (lower than the respective fitting projections 57) within the attachment part S2. Each female screw part 58 is perforated through the right frame 2R. A screw B2, i.e., a fastening member, is screwed into each female screw part 58.

As shown FIGS. 7 through 9, the apparatus-side fixing part 65 includes a pair of front and rear hooking pieces 66, a pair of front and rear fitting holes 67 and a pair of front and rear through holes 68. The pair of front and rear hooking pieces (hooking parts) 66 is formed so as to be hooked with the pair of front and rear hooking holes 56. The pair of front and rear fitting holes (fitting part) 67 is formed so as to be fitted with the pair of front and rear fitting projections 57. The pair of front and rear through holes 68 is formed so that the screws B2 penetrate through them.

The pair of front and rear hooking pieces 66 is formed at an upper end part of the case body 63 of the gear case 61. The front hooking piece 66 is formed at a front upper part of the support plate 63b. The rear hooking piece 66 is formed at an upper end part of the rear fixing plate 63a. Each hooking piece 66 is formed so as to slightly extend from the upper end part of the case body 63 to the right side and so as to bend upward. That is, each hooking piece 66 is formed approximately into a shape of L in a front view (see FIG. 9). The pair of front and rear hooking pieces 66 is formed into a shape insertible through the corresponding hooking hole 56. Each hooking piece 66 is formed into a trapezoidal shape tapered upward (see FIGS. 7 and others). The rear hooking piece 66 is formed to be longer than the front hooking piece 66 in the front-rear direction.

The pair of front and rear fitting holes 67 is perforated through the lower part of the fixing plate 63a. The pair of front and rear fitting holes 67 is formed into a shape into which the corresponding fitting projection 57 can be fitted. The front fitting hole 67 is formed into a long hole extending in the up-down direction in a side view (see FIG. 7). The rear fitting hole 67 is formed into a long hole extending in the front-rear direction in a side view (see FIG. 7).

The pair of front and rear through holes 68 is perforated through the lower end part (lower than the respective fitting holes 67) of the pair of front and rear fixing plates 63a. Each through hole 68 is formed into a circular shape through which the screw B2 can be loosely inserted in a side view.

Next, a step in attaching the second drive transmitting unit 60 into the attachment part S2 will be described. At first, an operator pulls the sheet feed cassette 3 out of the apparatus body 2 (the attachment part S1) and turns the apparatus body 2 laterally (or inverts top-bottom) to be able to readily proceed the operation. In succession, the operator inserts the second drive transmitting unit 60 into the attachment part S2 (see FIG. 3) and inserts each hooking piece 66 of the gear case 61 into each hooking hole 56 of the right frame 2R (see FIG. 9).

Then, the operator brings each fixing plate 63a of the case body 63 into contact with the inner surface F2 of the right frame 2R while hooking each hooking piece 66 with each hooking hole 56. Then, each fitting projection 57 of the right frame 2R fits into each hooking hole 67 of the case body 63 (see FIG. 9). Positioning in the front-rear direction of the second drive transmitting unit 60 is achieved by fitting the fitting projection 57 into the front vertically-long fitting hole 67. Meanwhile, vertical positioning of the second drive transmitting unit 60 is achieved by fitting the fitting projection 57 with the rear longitudinally-long fitting hole 67.

Next, the operator screws the screw B2 penetrated through each penetration hole 68 of the gear case 61 from inside to each female screw part 58 of the right frame 2R (see FIG. 9). Then, it is possible to rigidly fix the gear case 61 (the second drive transmitting unit 60) to the apparatus body 2 (the attachment part S2) by fastening the two screws B2. Thereby, the second drive transmitting unit 60 is fixed in a state being positioned within the attachment part S2 (attachment is completed). It is noted that after the attachment of the second drive transmitting unit 60, the operator returns the apparatus body 2 to a normal posture and attaches the sheet feed cassette 3 into the apparatus body (the attachment part S1).

It is noted that because the second drive transmitting unit 60 can be taken out of the attachment part S2 by carrying out a step reversed from the attachment step described above, its description will be omitted here.

According to the second drive transmitting unit 60 described above, the gear case 61 is positioned within the attachment part S2 by hooking the hooking piece 66 with the hooking hole 56 and fitting the fitting projection 57 into the fitting hole 67. Still further, the fixing plate 63a is fastened to the apparatus body 2 (the right frame 2R) through the screw B2. Thereby, the gear case 61 is fixed within the attachment part S2. Meanwhile, this arrangement makes it also possible to take the gear case 61 out of the attachment part S2 by releasing the fixing plate 63a (the screw B2), by unhooking the hooking piece 66 from the hooking hole 56, and by disengaging the fitting projection 57 from the fitting hole 67. That is, the plurality of gears 621 through 626 composing the part of the series of gear train containing the first and second gear trains 53 and 62 can be attached/detached through the lower surface 2g of the apparatus body 2 in the condition supported by the gear case 61. This arrangement makes it possible to readily replace the plurality of gears 621 through 626.

By the way, there is a case when linear velocity of the photosensitive drum 30 and others and pressure of the fixing nip part 13c of the fixing unit 13 are changed along with a change of a specification of the printer 1. For instance, if the pressure of the fixing nip part 13c increases, a driving torque of the heat roller 13a may increase. In such a case, it may be necessary to improve an output of the main motor 51 or to change designs such as a gear ratio of the respective gear trains 53 and 62. Then, the second drive transmitting unit 60 of the present embodiment is configured to be able to change the driving torque to be applied to the heat roller 13a and others without changing the designs of the main motor 51 and the gear trains 53 and 62.

Figure 10:
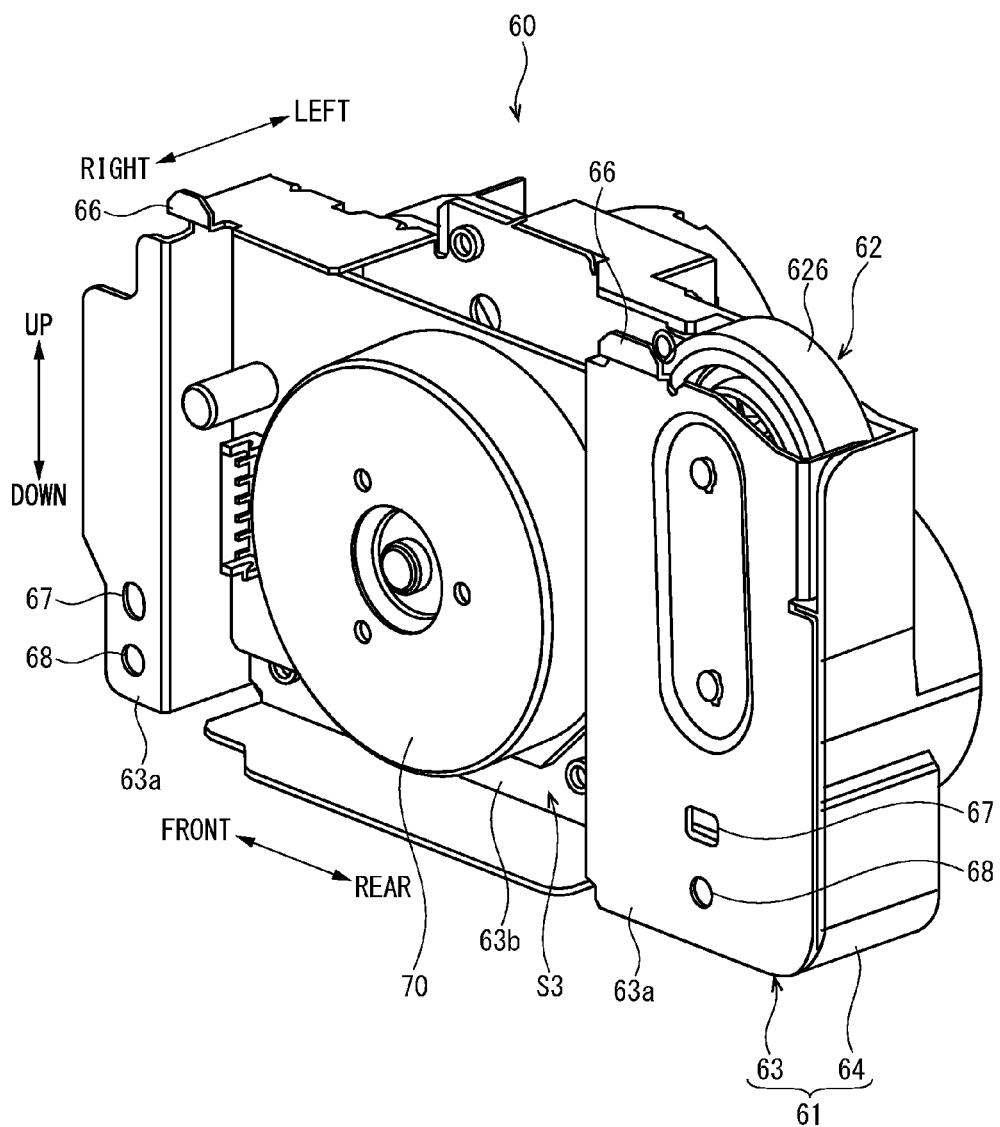
FIG. 10 is a perspective view illustrating a state in which a sub motor is attached to the second drive transmitting unit of one embodiment of the present disclosure.
Figure 11:
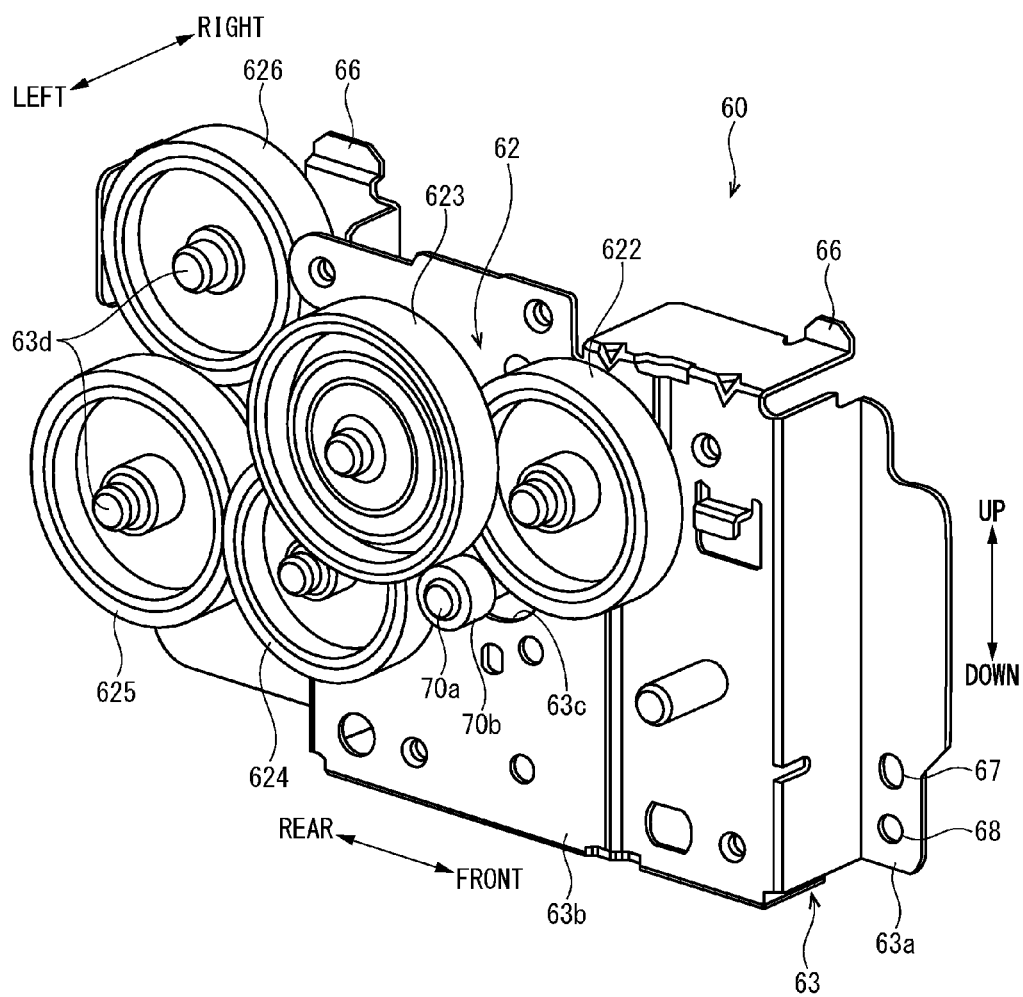
FIG. 11 is a is a perspective view illustrating the second gear train when the sub motor is attached to the second drive transmitting unit of one embodiment of the present disclosure.
Figure 12:
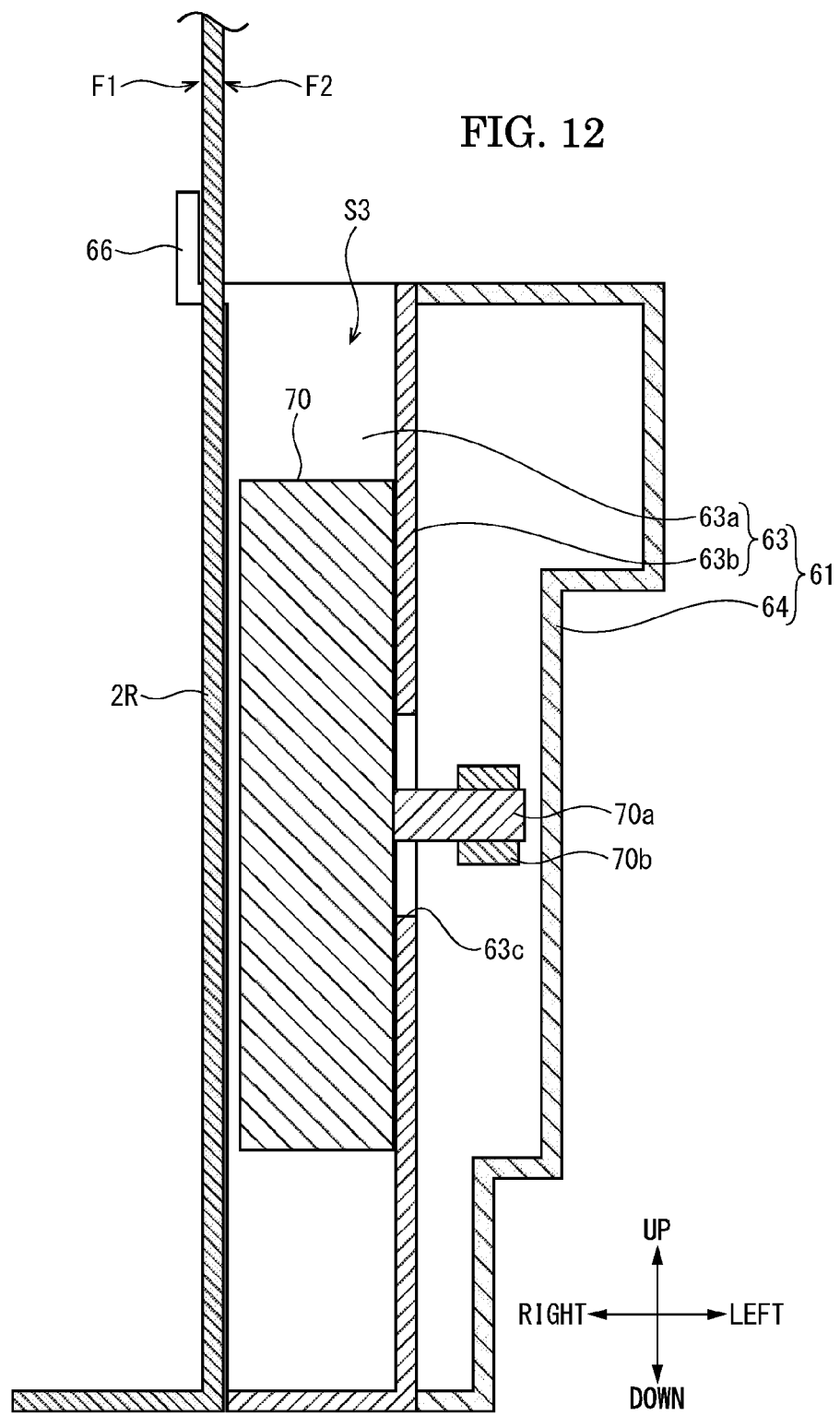
FIG. 12 is a sectional view, seen from a rear side, illustrating the state in which the sub motor is attached to the second drive transmitting unit of one embodiment of the present disclosure.

Then, a sub-motor (sub-driving part) 70 provided attachably to/detachably from the gear case 61 will be described below with reference to FIGS. 10 through 12. FIG. 10 is a perspective view illustrating a state in which the sub-motor 70 is attached to the second drive transmitting unit 60, FIG. 11 is a perspective illustrating view the second gear train 62 when the sub-motor 70 is attached to the second drive transmitting unit 60, and FIG. 12 is a section view, seen from the rear side, illustrating a state in which the sub-motor 70 is attached to the second drive transmitting unit 60. It is noted that the second gear train 62 is not shown in FIG. 12.

As shown in FIGS. 10 and 11, the sub-motor 70 is composed of a so-called stepping motor or the like held on the right side surface of the case body 63. The sub-motor 70 is detached from the gear case 61 when a removable gear 621 is attached to the gear case 61 (see FIG. 7). The sub-motor 70 is attached to the gear case 61 when the removable gear 621 is detached from the gear case 61 and rotates the heat roller 13a through the transmission gears 622 through 626.

A case when the sub-motor 70 is added to the second drive transmitting unit 60 will be described below. It is noted that the second drive transmitting unit 60 is assumed to be detached from the attachment part S2 in the following description.

At first, the operator removes the cover 64 out of the case body 63 and pulls the removable gear 621 out of the support shaft 63d (see FIG. 11). Next, the operator disposes the sub-motor 70 on an outer surface (right surface) of the support plate 63b of the case body 63 (see FIG. 10) and inserts an output shaft 70a of the sub-motor 70 into an insertion hole 63c of the support plate 63b (see FIG. 11). Then, the operator fixes the sub-motor 70 to the outer surface of the support plate 63b by a plurality of screws not shown. In this state, a pinion gear 70b fixed to a tip of the output shaft 70a meshes with the transmission gear 623 from underneath (see FIG. 11).

Then, after attaching the cover 64 to the case body 63, the operator attaches the second drive transmitting unit 60 in which the sub-motor 70 has been added to the attachment part S2 (see FIG. 3). In this state, the sub-motor 70 is disposed in a disposition space S3 defined between the right frame 2R and the support plate 63b (see FIG. 12). It is noted that because the step for attaching the second drive transmitting unit 60 is the same with those described above, its description will be omitted here.

According to the second drive transmitting unit 60 described above, the sub-motor 70 is detached from the gear case 61 when the removable gear 621 is attached and is attached to the gear case 61 when the removable gear 621 is detached. That is, the sub-motor 70 and the removable gear 621 are used exclusively from each other. For instance, in a case when the main motor 51 can rotates the heat roller 13a, the sub-motor 70 is detached from the gear case 61, and the removable gear 621 and the transmission gears 622 through 626 transmit the rotational force of the main motor 51 to the heat roller 13a.

However, if the main motor 51 is unable to rotate the heat roller 13a (due to insufficient torque), the removable gear 621 is detached from the gear case 61 (the case body 63). That is, the second gear train 62 of the second drive transmitting unit 60 is separated from the first gear train 53 of the first drive transmitting unit 50. Accordingly, the rotational force to be transmitted from the main motor 51 to the heat roller 13a is cut off. The main motor 51 rotates the plurality of gears 531 through 535 composing the first gear train 53 (see FIG. 5). The sub-motor 70 rotates the plurality of transmission gears 622 through 626 composing the second gear train 62 (see FIG. 11). That is, the sub-motor 70 rotates the first reverse roller pair 44 and the heat roller 13a (see FIG. 5). As described above, it is possible to attach/detach the sub-motor 70 corresponding to the degree of the torque required for the rotation of the heat roller 13a. Thus, this arrangement makes it possible to address with the change of the driving torque of the heat roller 13a without increasing the output of the main motor 51 or modifying the gear ratio of the respective gear trains 53 and 62. That is, it is possible to improve robustness.

Figure 13:
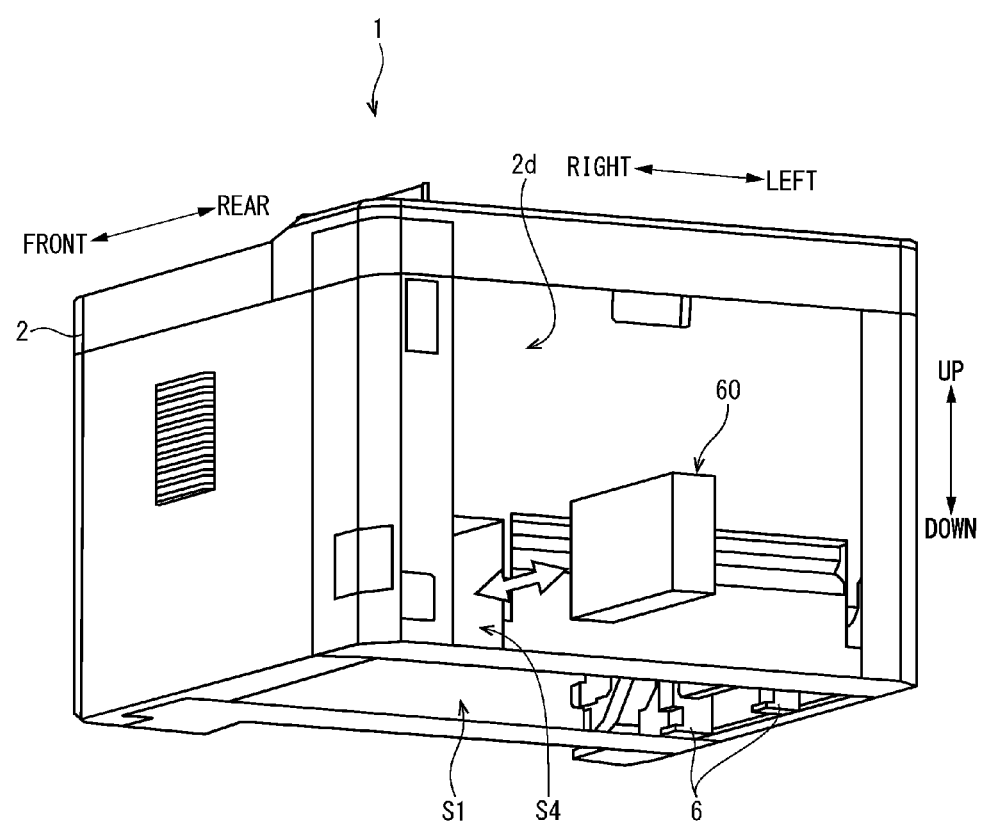
FIG. 13 is a perspective view illustrating a printer according to a modified example of one embodiment of the present disclosure.

It is noted that although the second drive transmitting unit 60 of the present embodiment is attached to the attachment part S2 opened at the lower surface 2g of the apparatus body 2, the present disclosure is not limited to such configuration. For instance, an attachment part S4 may be defined from the rear side plate 2d to the inside of the apparatus body 2 (see FIG. 13). That is, the attachment part S4 may be defined as a space opened to the back surface of the apparatus body 2. Still further, the attachment part S2 may be provided on the left side or on the front side of the apparatus body 2.

Figure 14:
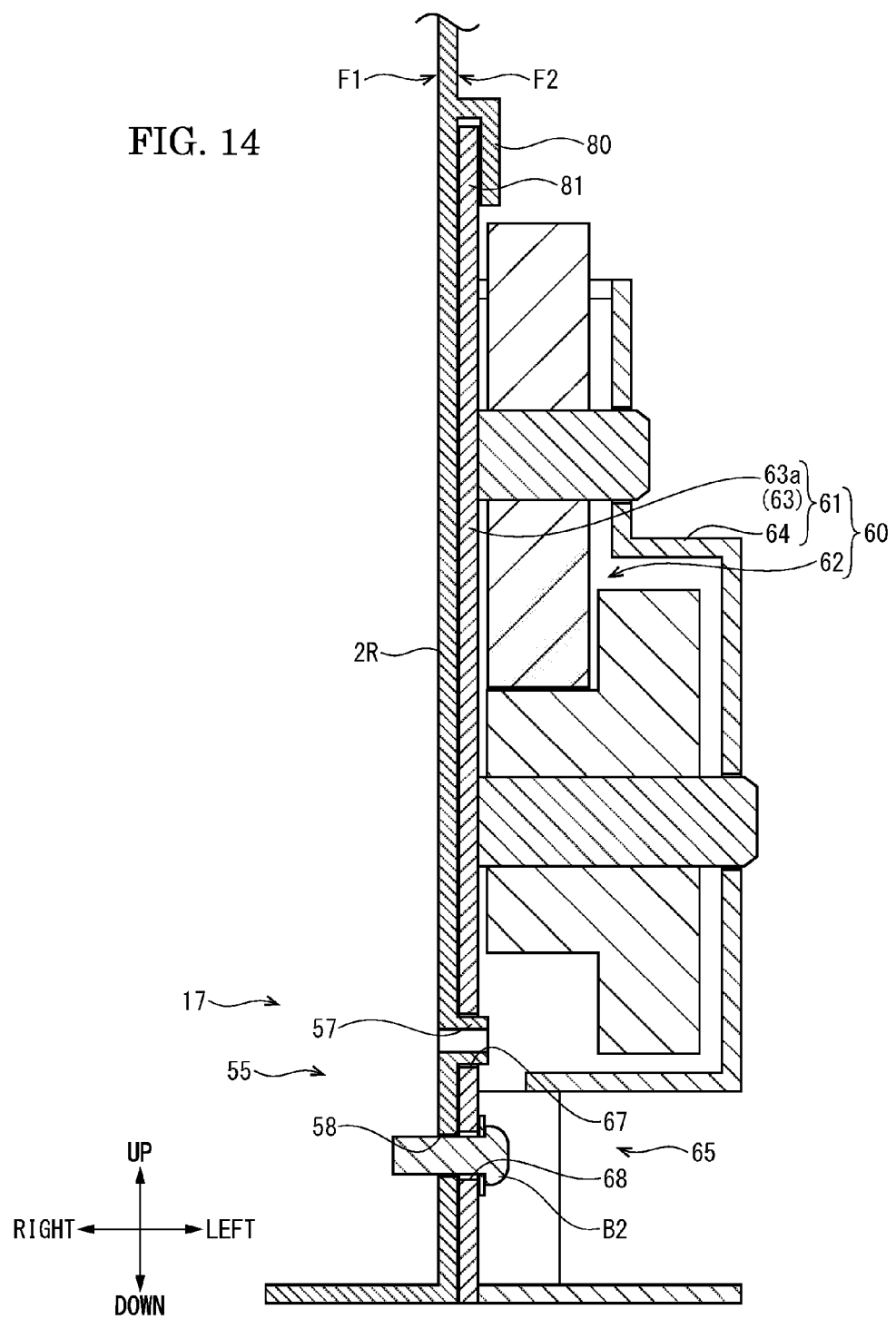
FIG. 14 is a sectional view, seen from the rear side, illustrating the second drive transmitting unit according to the other modified example of one embodiment of the present disclosure.

It is noted although the body-side fixing parts 55 (56 through 58) and the apparatus-side fixing parts 65 (66 through 68) are provided by two each in the present embodiment described above, the present disclosure is not limited to such configuration as far as one or more fixing part is provided. Still further, the hooking hole 56 may be defined through the case body 63 and the hooking piece 66 may be formed on the right frame 2R (not shown). Besides those described above, a plate-like hooking piece 81 may be hooked with a hook part 80 provided on the right frame 2R, instead of the hooking hole 56 (see FIG. 14). The fitting projection 57 maybe also formed on the case body 63, and the fitting hole 67 may be defined through the right frame 2R (not shown). Still further, the female screw part 58 may be defined through the case body 63, and the through hole 68 may be defined through the right frame 2R (not shown).

It is noted that although the removable gear 621 of the second drive transmitting unit 60 of the present embodiment indirectly receives the rotational force from the main motor 51, the present disclosure is not limited to such configuration. The removable gear 621 may mesh with the pinion gear 51b so as to directly receive the rotational force of the main motor 51. It is noted that the number of gears of the respective gear trains 53 and 62 described above is exemplary one, and the present disclosure is not limited to such configuration.

It is noted that while the second drive transmitting unit 60 of the present embodiment is used also as the slide guide 6, the present disclosure is not limited to such configuration and the slide guide 6 may be omitted from the gear case 61. In this case, the second drive transmitting unit 60 may be attached to the attachment part S2 without pulling the sheet feed cassette 3 out of the attachment part S1.

Still further, the case in which the present disclosure is applied to the printer 1 as one example has been described in the present embodiment, the present disclosure is not limited to such case, and the present disclosure is applicable also to a color printer, a copying machine, a facsimile, a multi-function printer or the like.

While the preferable embodiment and its modified example of the drive transmitting unit and the image forming apparatus or the like of the present disclosure have been described above and various technically preferable configurations have been illustrated, a technical range of the disclosure is not to be restricted by the description and illustration of the embodiment. Further, the components in the embodiment of the disclosure maybe suitably replaced with other components, or variously combined with the other components. The claims are not restricted by the description of the embodiment of the disclosure as mentioned above.

What is claimed is:

1. A drive transmitting unit, comprising:
a plurality of gears composing a part of a gear train transmitting a rotational force from a main driving part to a rotational element within an apparatus body; and
a gear case provided attachably to/detachably from an attachment part defined from a lower surface or a back surface of the apparatus body to inside of the apparatus body while rotatably supporting the plurality of gears,
the gear case including:
a hook part hooked with a hooked part provided within the attachment part;
a fitting part fitted with a fitted part provided within the attachment part; and
a fixing part fixed to the apparatus body through a fastening member;
further comprising a sub-driving part provided attachably to/detachably from the gear case,
wherein the plurality of gears includes:
at least one removable gear provided attachably to/detachably from the gear case and directly or indirectly receiving the rotational force of the main driving part; and
at least one transmission gear configured to transmit rotation of the removable gear to the rotational element: and
the sub-driving part is detached from the gear case when the removable gear is attached to the gear case, and
the sub-driving part is attached to the gear case when the removable gear is detached from the gear case and rotates the rotational element through the transmission gear.

2. The drive transmitting unit according to claim 1, wherein the attachment part is defined as a part of a cassette attachment part of the apparatus body insertably supporting a sheet feed cassette, and
the gear case includes a slide guide slidably engaging with a slider of the sheet feed cassette.

3. The drive transmitting unit according to claim 2, wherein the gear case includes a case body covered by a cover,
the case body being attached to either one frame of a pair of frames disposed so as to interpose the cassette attachment part,
the hook part is a pair of hooking pieces formed on the case body while being separated in a direction in which the sheet feed cassette is inserted/removed,
one of the pair of hooking pieces is formed to be longer than another one of the hooking pieces in the direction in which the sheet feed cassette is inserted/removed,
the hooked part is a pair of hooking holes perforating through the one frame,
the pair of hooking pieces hooked with the pair of hooking holes,
the fitting part is a pair of fitting holes perforated through the case body while being separated in the direction in which the sheet feed cassette is inserted/removed,
one of the pair of fitting holes is formed into a long hole extending in a vertical direction,
another one of the pair of fitting holes is formed into a long hole extending in the direction in which the sheet feed cassette is inserted/removed,
the fitted part is a pair of fitting projections projectively provided on the one frame and
the pair of fitting holes is fitted with the pair of fitting projections.

4. An image forming apparatus, comprising:
an apparatus body;
a drive transmitting unit removably attached to the apparatus body;
wherein the drive transmitting unit comprises:
a plurality of gears composing a part of a gear train transmitting a rotational force from a main driving part to a rotational element within an apparatus body; and
a gear case provided attachably to/detachably from an attachment part defined from a lower surface or a back surface of the apparatus body to inside of the apparatus body while rotatably supporting the plurality of gears,
the gear case including:
a hook part hooked with a hooked part provided within the attachment part;
a fitting part fitted with a fitted part provided within the attachment part; and
a fixing part fixed to the apparatus body through a fastening member;
further comprising a sub-driving part provided attachably to/detachably from the gear case,
wherein the plurality of gears includes:
at least one removable gear provided attachably to/detachably from the gear case and directly or indirectly receiving the rotational force of the main driving part; and
at least one transmission gear configured to transmit rotation of the removable gear to the rotational element: and
the sub-driving part is detached from the gear case when the removable gear is attached to the gear case, and
the sub-driving part is attached to the gear case when the removable gear is detached from the gear case and rotates the rotational element through the transmission gear.

5. The image forming apparatus according to claim 4, wherein the fixing part includes a through hole through which the fastening member penetrates, and
wherein the attachment part includes a female screw part into which the fastening member penetrating through the through hole is screwed.

6. A drive transmitting unit, comprising:
a plurality of gears composing a part of a gear train transmitting a rotational force from a main driving part to a rotational element within an apparatus body; and
a gear case provided attachably to/detachably from an attachment part defined from a lower surface or a back surface of the apparatus body to inside of the apparatus body while rotatably supporting the plurality of gears,
the gear case including:
a hook part hooked with a hooked part provided within the attachment part;
a fitting part fitted with a fitted part provided within the attachment part; and
a fixing part fixed to the apparatus body through a fastening member;

wherein the attachment part is defined as a part of a cassette attachment part of the apparatus body insertably supporting a sheet feed cassette, and the gear case includes a slide guide slidably engaging with a slider of the sheet feed cassette.

* * * * *